(12) United States Patent
Qian et al.

(10) Patent No.: US 9,607,599 B2
(45) Date of Patent: Mar. 28, 2017

(54) PARTICULATE SOUND BARRIER AND SOUND ABSORPTION/INSULATION BOARD THEREOF

(71) Applicant: SICHUAN ZISEN ACOUSTICS TECHNICAL CO., LTD., Chengdu, Sichuan (CN)

(72) Inventors: Weixin Qian, Sichuan (CN); Jiashu Shen, Sichuan (CN)

(73) Assignee: SICHUAN ZISEN ACOUSTICS TECHNICAL CO., LTD., Chengdu, Sichuan (CN)

( * ) Notice: Subject to any disclaimer, the term of this patent is extended or adjusted under 35 U.S.C. 154(b) by 0 days.

(21) Appl. No.: 14/986,241

(22) Filed: Dec. 31, 2015

(65) Prior Publication Data

US 2016/0118034 A1 Apr. 28, 2016

Related U.S. Application Data

(63) Continuation-in-part of application No. PCT/CN2014/089983, filed on Oct. 31, 2014.

(30) Foreign Application Priority Data

Sep. 30, 2014 (CN) .......................... 2014 1 0519809

(51) Int. Cl.
*G10K 11/168* (2006.01)
*E01F 8/00* (2006.01)
(Continued)

(52) U.S. Cl.
CPC .............. *G10K 11/168* (2013.01); *B32B 1/00* (2013.01); *B32B 1/08* (2013.01); *B32B 3/04* (2013.01);
(Continued)

(58) Field of Classification Search
CPC .. B32B 5/16; B32B 5/30; E01F 8/0005; E01F 8/0017; E01F 8/0029
(Continued)

(56) References Cited

U.S. PATENT DOCUMENTS 4,402,384 A * 9/1983 Smith .................... E01F 8/0023
181/210
5,272,284 A * 12/1993 Schmanski ........... E01F 8/0011
181/210
(Continued)

FOREIGN PATENT DOCUMENTS

CN 102926476 A 2/2013
CN 103614976 A 3/2014
(Continued)

OTHER PUBLICATIONS

Translation of CN103614976; accessed Oct. 27, 2016; <http://translationportal.epo.org/emtp/translate/?ACTION=description-retrieval&COUNTRY=CN&ENGINE=google&FORMAT=docdb&KIND=A&LOCALE=en_EP&NUMBER=103614976&OPS=ops.epo.org/3.1&SRCLANG=zh&TRGLANG=en>.*

*Primary Examiner* — Jeremy Luks
(74) *Attorney, Agent, or Firm* — Novick, Kim & Lee, PLLC; Allen Xue

(57) ABSTRACT

A particulate sound absorption board used for sound absorption surface layer of sound absorption/insulation board is a micropore particle board formed by splicing skeleton particles and filling particles which are covered with binding agent on the surface and have small angularity coefficient. The particulate sound insulation board used for sound insulation surface layer of sound absorption/insulation board is a compressed board formed by closely splicing skeleton particles, filling particles, binding agent and coupling agent, and there is a resonance sound absorption cavity that functions together with sound absorption surface layer in the
(Continued)

board body. The particulate sound barrier consists of column and more than two overlapped sound absorption/insulation boards fixed between adjacent columns. A convex-concave joint end face is set on the sound absorption/insulation board, and the sealing cushion is bound between adjacent end faces.

17 Claims, 12 Drawing Sheets

(51) Int. Cl.
| | |
|---|---|
| B32B 5/16 | (2006.01) |
| B32B 1/08 | (2006.01) |
| B32B 5/02 | (2006.01) |
| B32B 5/30 | (2006.01) |
| B32B 7/04 | (2006.01) |
| B32B 7/08 | (2006.01) |
| B32B 15/02 | (2006.01) |
| B32B 15/16 | (2006.01) |
| B32B 15/18 | (2006.01) |
| B32B 1/00 | (2006.01) |
| B32B 3/04 | (2006.01) |
| G10K 11/165 | (2006.01) |

(52) U.S. Cl.
CPC ............ *B32B 5/028* (2013.01); *B32B 5/16* (2013.01); *B32B 5/30* (2013.01); *B32B 7/045* (2013.01); *B32B 7/08* (2013.01); *B32B 15/02* (2013.01); *B32B 15/16* (2013.01); *B32B 15/18* (2013.01); *E01F 8/0011* (2013.01); *E01F 8/0029* (2013.01); *G10K 11/165* (2013.01); B32B 2250/02 (2013.01); B32B 2260/025 (2013.01); B32B 2260/046 (2013.01); B32B 2262/101 (2013.01); B32B 2264/10 (2013.01); B32B 2307/10 (2013.01); B32B 2307/102 (2013.01); *B32B 2307/712* (2013.01); *B32B 2307/714* (2013.01); *B32B 2307/7265* (2013.01); *B32B 2307/73* (2013.01); *B32B 2419/00* (2013.01); *B32B 2605/10* (2013.01)

(58) Field of Classification Search
USPC .......................................... 181/210, 290, 294
See application file for complete search history.

(56) References Cited

U.S. PATENT DOCUMENTS

| | | | | |
|---|---|---|---|---|
| 5,438,171 | A * | 8/1995 | Schmanski | B29C 70/525 181/210 |
| 5,965,852 | A * | 10/1999 | Roschke | E01F 8/0023 181/210 |
| 6,664,205 | B2 * | 12/2003 | Oda | C04B 28/26 252/62 |
| 6,899,200 | B1 * | 5/2005 | Roberts | E01F 8/0023 181/284 |
| 7,789,193 | B2 * | 9/2010 | Suzuki | E01F 8/0035 181/210 |
| 8,051,950 | B2 * | 11/2011 | Alston | B60R 13/08 181/290 |
| 2006/0072372 | A1 * | 4/2006 | Thomas | B32B 5/16 367/1 |
| 2007/0131480 | A1 * | 6/2007 | Corbin, Jr. | B64F 1/26 181/210 |
| 2013/0025217 | A1 * | 1/2013 | Corbin, Jr. | E01F 8/0023 52/144 |

FOREIGN PATENT DOCUMENTS

| | | |
|---|---|---|
| CN | 203543225 U | 4/2014 |
| CN | 203812561 U | 9/2014 |
| JP | 2011184912 A | 9/2011 |
| WO | 2007080335 A2 | 7/2007 |

* cited by examiner

PARTICULATE SOUND BARRIER AND SOUND ABSORPTION/INSULATION BOARD THEREOF

CROSS-REFERENCE TO RELATED APPLICATIONS

This application is a continuation in part application of PCT application PCT/CN2014/089983, filed on Oct. 31, 2014, which claims the benefit of priority from Chinese Patent Application No. 201410519809.5, filed on Sep. 30, 2014, the content of which is incorporated herein by reference in its entirety.

TECHNICAL FIELD

This invention relates to a sound insulation and noise reduction engineering material, especially to a sound elimination component for sound barrier.

BACKGROUND OF THE INVENTION

With the rapid development of high-speed railway in China, adjacent residents and schools are increasingly affected by high-speed railway noise. Hence, the sound barrier for high-speed railway is generally set during the construction of high-speed railway. Through sound barrier, a facility is inserted between sound source and receivers to significantly attenuate sound wave so as to reduce noise effect in a certain area where receivers are located.

Sound barrier is mainly comprised of steel structure column and sound absorption/insulation board, in which the former is the main loaded component of sound barrier, and fixed on the road anti-collision wall or trackside pre-embedded steel plate through bolting or welding; the latter is the main sound absorption/insulation component, and generally fixed in the H-type column slot by mechanical means. According to the material of sound absorption/insulation board, sound barrier for high-speed railway is mainly divided into metal sound barrier and nonmetal concrete sound barrier. From the application condition of sound barrier, metal sound barrier will be damaged because of fatigue. In France, Japan and other countries where high-speed railway technology is developed early, metal sound barrier was mainly used in the past, and most of them have been replaced because of fatigue failure. Nonmetal concrete sound barrier is widely used in Germany where high-speed railway is well developed, and featured by good durability, solidness and firmness, and can be built into various art structures based on local ethnic culture with low construction and maintenance costs. Compared to metal sound barrier, it has greater advantages.

But for existing sound barrier for high-speed railway, metal sound barrier or nonmetal concrete sound barrier, the main sound absorption function is derived from the sound absorption material filled in the sound absorption/insulation board, generally the glass wool which is prone to be damped or fiberized in the long term use. Damped glass wool will fall down to form block, which will affect the sound absorption property, and the dust and microfiber formed by glass wool after aging fly apart, which will pollute the atmospheric environment.

For this reason, it is urgent to look for a sound barrier with better durability.

SUMMARY OF THE INVENTION

The technical problem to be solved by the present intention is to provide a particulate sound barrier which is of stable acoustic performance and mainly made of particle board, and its sound absorption/insulation board.

The inventor developed a new particle board with excellent sound absorption property, i.e. particulate sound absorption board during the research of particle board, and submitted the invention of "A Particulate sound Absorption Board and its Preparation Method" (application no.: CN2014103477351) to the State Intellectual Property Office on Jul. 22, 2014. Cheap particles, e.g. sand, ceramsite and recycled building waste particle, are laminated with binding agent and trimmed, and then spliced and squeezed mutually to form micropore. The micropore of the said particulate sound absorption board is formed by closely squeezing the particles of different diameters, and the skeleton of sound absorption board is formed from skeleton particles, and the pore between skeletons is filled with a proper proportion of filling particle which is thinner than skeleton particle. These pores are divided into connected pore which is connected with at least two adjacent pores and semi-connected pore which is connected with one adjacent pore at most so as to form a specific micropore structure required for sound absorption. The study shows that the equivalent diameter of the micropore formed is related to the diameter of particle. For example, the cross section area of the micropore formed by squeezing round particles of the same size with the radius of R is $S_X \approx 0.163R^2$ $$\text{Micropore diameter } d \approx (4 \times 0.163R^2/3.14)^{1/2} = (0.207R^2)^{1/2} \approx 0.455R$$

i.e., when 10 mm particle board formed from 20-24 mesh particles is selected, particle diameter is 0.8-0.9 mm, micropore diameter is about 0.182-0.2 mm, and porosity is about 25%.

When 10 mm particle board formed from 24-40 mesh particles is selected, particle diameter is 0.5-0.8 mm, micropore diameter is about 0.12-0.182 mm, and porosity is about 25%.

When 10 mm particle board formed from 40-50 mesh particles is selected, particle diameter is 0.37-0.5 mm, micropore diameter is about 0.09-0.12 mm, and porosity is about 25%.

Hence, for the resonance sound absorption structure of particle board, micropores of different equivalent diameters can be obtained only by adjusting the diameter of particle, and the cost is very low, which means the particulate sound absorption board with excellent sound absorption property can be manufactured with very cheap materials and simple technologies.

Through the theoretical research on the sound absorption mechanism of the said particulate sound absorption board and a large number of trials, the inventor finds the resonance sound absorption structure made of particulate sound absorption board has the following sound absorption characteristics.

Sound absorption peak is increased with the increase in board thickness, and resonance frequency moves towards the low frequency.

With the increase in mesh number of particles used, the pore of particle board is decreased, frequency band is widened, and sound absorption coefficient is increased.

When particle mixture ratio and board thickness are fixed, the depth of rear cavity is increased, and sound absorption frequency spectrum moves towards the low frequency.

Through comparison, the sound absorption characteristics of resonance sound absorption structure made of the said particulate sound absorption board are basically the same with that of sound absorption structure of micro-perforated panel, and the difference is the depth of cavity. For example, the sound absorption curve of micro-perforated panel+50 mm (deep) cavity is almost identical with that of 10 mm (board thickness) particulate sound absorption board+40 mm (deep) cavity. According to the analysis conducted by inventor, the cause of deviation is that the micropore in the particulate sound absorption board is bent, which means the depth of rear cavity is increased.

To ensure the particulate sound absorption board can form appropriate pore so as to control its sound absorption property in a better manner, the angularity coefficient of particles which are covered with binding agent and selected for particulate sound absorption board is better less than 1.3.

The inventor developed a new particle board with excellent sound insulation property, i.e. particulate sound insulation board during the research of particle board, and submitted the invention of "A Particulate sound Insulation Board and its Preparation Method" (application no.: CN2014104053830) to the State Intellectual Property Office on Aug. 8, 2014. The sound insulation board is mainly made of particles, and composed of skeleton and filler with which the skeleton pore is filled; the said skeleton is formed by splicing skeleton particles, and the said filler is composed of filling particle, binding agent and coupling agent. The pore between large particles is filled with smaller particles of different sizes and sufficient binding agent to ensure the sound insulation board is tight and pore-free, and all pores between particles are closed so as to meet the requirements of sound insulation board, and block the penetration of sound wave.

The diameter of skeleton particle is recommended to be 2-8 times of that of filling particle. Further, the said skeleton particle is composed of large and small skeleton particles, in which the diameter of large skeleton particle is 2 times of that of small skeleton particle. Particles used for sound insulation board are selected from raw materials with low price, light weight and wide availability, e.g. sand, ceramsite and recycled building waste particle so as to reduce the production cost of particulate sound insulation board. Meanwhile, to ensure the bonding strength and cohesive force of particles, the said binding agent is extracted from epoxy resin, phenolic resin, urea resin and furfuryl alcohol resin, and its addition amount is 4-6% by weight of sound insulation particle to ensure all pores between particles in the sound insulation board are filled with binding agent, and prevent the overflow of binding agent. Silane coupling agent and coupling agent containing isobutyl functional group are added into the binding agent used for sound insulation board, and the addition amount is 1-5% by weight of binding agent. After the addition of coupling agent, the hydrophobic layer can be formed on the sound insulation board to prevent the moisture into the particle board so as to ensure the sound insulation board has waterproof and anti-corrosion property.

To ensure the sound insulation layer is tight and pore-free, the angularity coefficient of raw material particle selected for sound insulation board is better greater than 1.5.

Skeleton particle and filling particle used for sound insulation board are selected from raw materials with low price, light weight and wide availability, e.g. sand, ceramsite and recycled building waste particle so as to reduce the production cost of particulate sound insulation board.

The inventor considers the application of the said particulate sound absorption board and particulate sound insulation board into the manufacturing of sound barrier to improve its durability.

The technical scheme adopted by this invention to solve its technical problem is as follows: particulate sound absorption/insulation board is composed of board body and its internal cavity. Board body consists of sound absorption surface layer on one side and sound insulation surface layer on the opposite side. The said sound absorption surface layer is made of particulate sound absorption board which is composed of particle and binding agent layer on the external surface of the said particle. The said particle is composed of skeleton particle and filling particle, in which the former is used for sound absorption board skeleton, and the latter flows into the pore between skeleton particles to form sound absorption pore. The cavity in the board body forms a resonance sound absorption cavity that functions together with sound absorption surface layer.

The said board body is free from sound absorption filling materials.

The thickness ratio (d:D) of the said sound absorption surface layer and resonance sound absorption cavity is 4-8.

The thickness of the said sound absorption surface layer is 10-30 mm, and the thickness of resonance sound absorption cavity is 40-100 mm.

The said sound insulation surface layer is made of particulate sound insulation board which is composed of skeleton and filler. The skeleton is formed by splicing skeleton particles, and the said filler consists of filling particle, binding agent and coupling agent. The skeleton pore is filled with fillers, and the thickness of sound insulation surface layer is 20-50 mm.

The said particulate sound insulation board consists of the following components by weight: skeleton: 40-45 skeleton particles with average diameter of 0.8 mm and 0.4 mm, respectively; filler: filling particle consists of the following components by weight, 3.5-7 filling particles with average diameter of 0.2 mm, 7-14 filling particles with average diameter of 0.1 mm; binding agent and coupling agent: the addition amount of binding agent is 4-6% by total weight of skeleton particle and filling particle, and the addition amount of coupling agent is 1-5% by addition amount of binding agent.

Particles of the said particulate sound absorption board consist of the following components: skeleton: 90 skeleton particles with average diameter of 0.8 mm, 10 filling particles with average diameter of 0.15 mm. The addition amount of binding agent used to form binding agent layer is 3.5-6% by total weight of skeleton particle and filling particle, and 1-5% of coupling agent by weight of binding agent is added into the said binding agent.

The said board body is of half-subdivision composite structure formed by the side where sound absorption surface layer is located and the side where sound insulation surface layer is located, and the side wall adjacent to the side where sound absorption surface layer is located and the side where sound insulation surface layer is located is of concave-convex joint structure on the joint face in the thickness direction of the board.

Inner sides of the said sound absorption surface layer and sound insulation surface layer are provided with ribs respectively, which are mutually corresponding and connected to form rib wall.

Particulate sound barrier consists of column and more than two overlapped sound absorption/insulation boards fixed between adjacent columns. The said sound absorption/insulation board is composed of sound absorption surface layer on one side and sound insulation surface layer on the opposite side. The said sound absorption surface layer is made of particulate sound absorption board which is composed of particle and binding agent layer on the external surface of the said particle. The said particle is composed of skeleton particle and filling particle, in which the former is used for sound absorption board skeleton, and the latter flows into the pore between skeleton particles to form sound absorption pore; the sound insulation surface layer is made of particulate sound insulation board which is composed of skeleton and filler. The said skeleton is formed by splicing skeleton particles, and the said filler consists of filling particle, binding agent and coupling agent. The skeleton pore is filled with fillers, and the cavity in the board body forms a resonance sound absorption cavity that functions together with sound absorption surface layer.

A concave-convex joint end face is set on the said sound absorption/insulation board along the extension direction of board surface. The convex of the said concave-convex joint end face is a convex solid board surface, and connected to sound absorption surface layer and sound insulation surface layer. The concave of the said concave-convex joint end face is a hollow opening surface, and sealing cushion is bound on the convex at the joint part of adjacent sound absorption/insulation board.

Inner sides of the said sound absorption surface layer and sound insulation surface layer are provided with reinforcing rib layers respectively, and both sides of the said sound insulation surface layer adjacent to column are fixed with metal ring, and the said metal ring is connected to the reinforcing rib layer.

This invention has the following advantages: stable acoustic performance, good weather resistance and low manufacturing cost. The sound barrier of different colors is easily manufactured and cleaned, especially suitable for noise control of high-speed railway and road.

Figure 1:
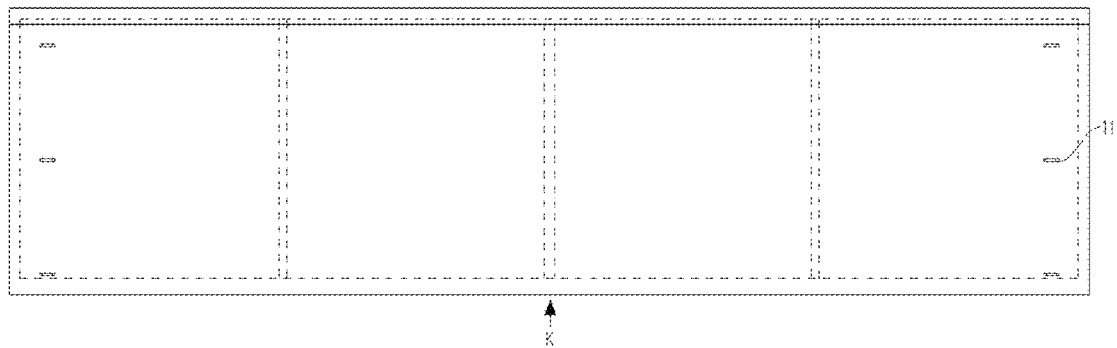
FIG. 1 is the front view of particulate sound absorption/insulation board of this invention.
Figure 2:
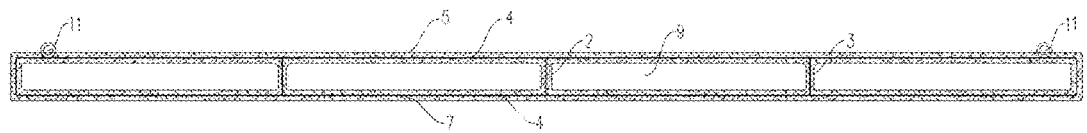
FIG. 2 is the left view of FIG. 1.
Figure 3:
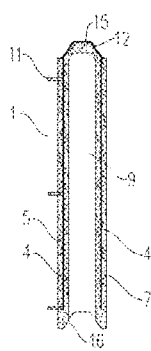
FIG. 3 is the K-direction view of FIG. 1.
Figure 4:
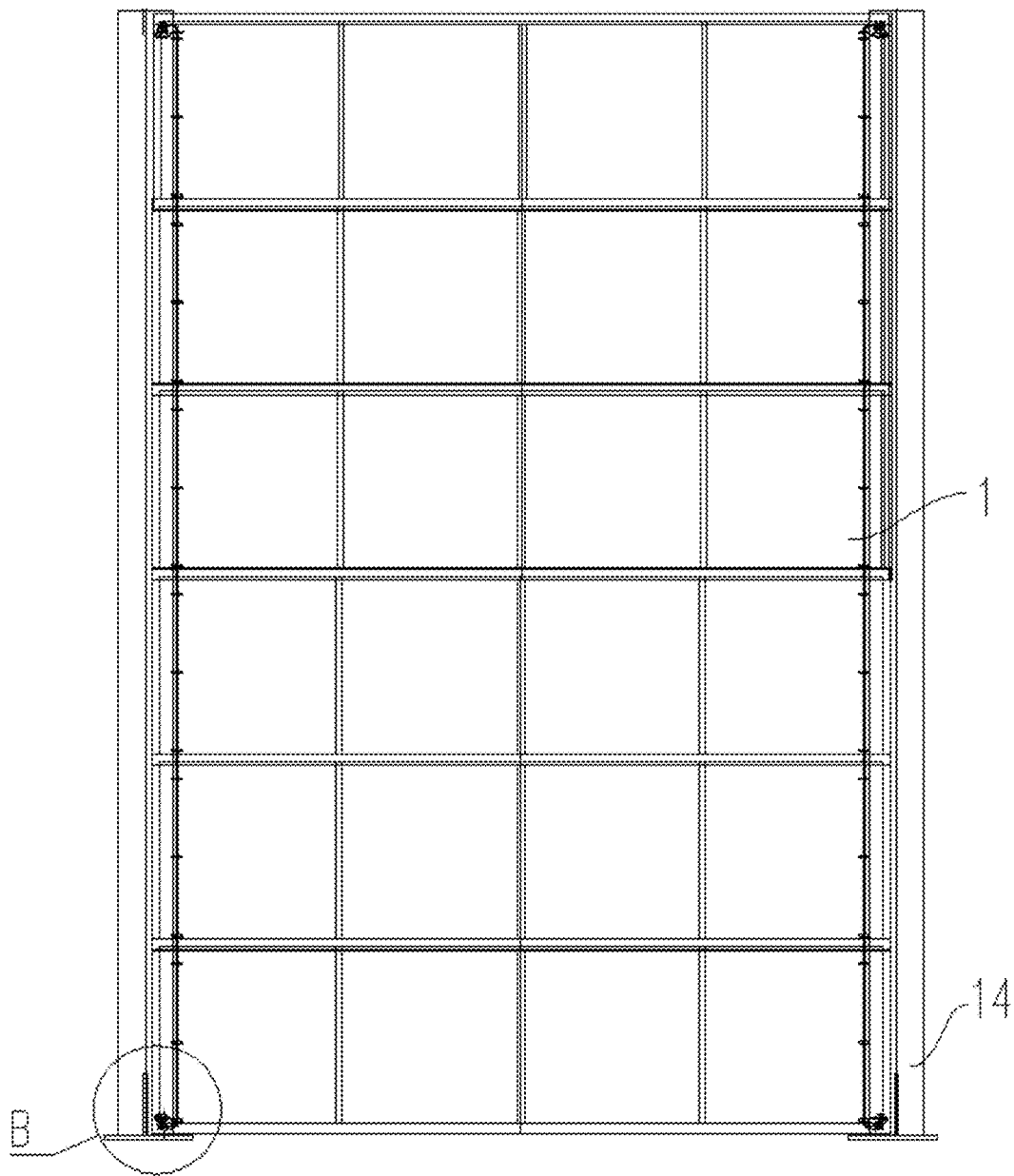
FIG. 4 is the front view of particulate sound barrier of this invention.

Marks in the drawings: 1—sound absorption/insulation board, 2—rib wall, 3—reinforcing rib for rib wall, 4—reinforcing rib layer, 5—sound insulation surface layer, 6—particulate sound insulation board, 7—sound absorption surface layer, 8—particulate sound absorption board, 9—resonance sound absorption cavity, 10—steel wire rope, 11—metal ring, 12—sealing cushion, 13—gasket, 14—column, 15—convex, 16—concade, 17—fixed pull ring, 18—press plate, 19—bolt, 25—rib, 27—rib, 50—the side where sound insulation surface layer is located, 61—skeleton particle, 62—filling particle, 63—binding agent and coupling agent, 70—the side where sound absorption surface layer is located, 80—particle, 81—skeleton particle, 82—filling particle, 83—sound absorption pore, 84—binding agent layer.

Specific Implementation Ways

This invention will be further described below in combination with figures and embodiments.

As shown in FIG. 1-20, the particulate sound absorption/insulation board of this invention is composed of board body and its internal cavity. Board body consists of sound absorption surface layer 7 on one side and sound insulation surface layer 5 on the opposite side. The said sound absorption surface layer 7 is made of particulate sound absorption board 8 which is composed of particle 80 and binding agent layer 84 on the external surface of the said particle 80. The said particle is composed of skeleton particle 81 and filling particle 82, in which the former is used for sound absorption board skeleton, and the latter flows into the pore between skeleton particles to form sound absorption pore 83. The said sound insulation surface layer 5 is made of particulate sound insulation board 6 which is composed of skeleton and filler. The said skeleton is formed by splicing skeleton particles 61, and the said filler consists of filling particle 62, binding agent and coupling agent 63. The skeleton pore is filled with fillers, and the cavity in the board body forms a resonance sound absorption cavity 9 that functions together with sound absorption surface layer 7. The board body is free from sound absorption filling materials. Low-cost particles are used as base material, and the resin is used as binding agent, and materials are widely available and low-cost. The internal cavity of particulate sound absorption board and sound absorption/insulation board can form a micropore resonance sound absorption structure to ensure the sound absorption/insulation board has satisfactory sound absorption/insulation property, so there is no need to add sound absorption materials, e.g. glass wool into the sound barrier so as to guarantee stable sound absorption property, and fundamentally avoid causing secondary pollution to the atmosphere environment since the dust and microfiber fly apart after the aging of glass wool and other general sound absorption materials. The sound barrier made of the said sound absorption/insulation board can use the particles of different colors to meet the appearance requirements proposed by customers, and can be easily cleaned.

Both particulate sound absorption board and resonance sound absorption cavity have excellent sound absorption property, which generally can be up to NRC=0.7 and above, so the sound absorption requirements of the sound barrier can also be met even if the said board body is not filled with sound absorption filling materials compared to general sound absorption/insulation board. Hence, it is recommended not to add sound absorption filling materials into the board body to ensure better weather resistance and more stable sound absorption property.

According to the sound absorption characteristics of particulate sound absorption board and general product requirements of the sound barrier, the thickness ratio (d:D) of the said sound absorption surface layer and resonance sound absorption cavity is better 1:4-8.

More specifically, the thickness of the said sound absorption surface layer is 10-30 mm, and the thickness of resonance sound absorption cavity is 40-100 mm. If exceeding the said limit, the property of resonance sound absorption structure is not significantly improved.

According to the sound insulation characteristics of particulate sound insulation board and product requirements of the sound barrier, the thickness of the said sound insulation surface layer is better 20-50 mm. If too thin, sound insulation property is poorer; if too thick, the sound insulation property is not significantly improved, and the mass and cost of the board are significantly increased.

Figure 15:
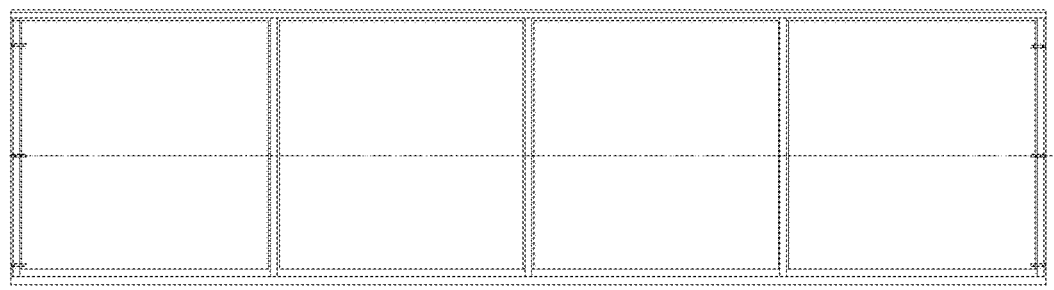
FIG. 15 is the front view of a half-subdivision composite structure available for particulate sound absorption/insulation board of this invention.
Figure 16:
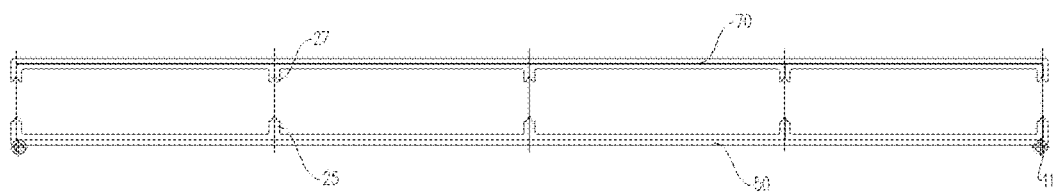
FIG. 16 is the top view of FIG. 15.
Figure 17:
FIG. 17 is the right view of FIG. 15.

Raw material diameter and mixture ratio of the particle used for particulate sound absorption board and particulate sound insulation board are different. For the convenience of manufacturing, as shown in FIGS. 15, 16 and 17, it is better to design the said board body as a half-subdivision composite structure formed by the side 70 where sound absorption surface layer is located and the side 50 where sound insulation surface layer is located. The side 70 where sound absorption surface layer is located and the side 50 where sound insulation surface layer is located are formed respectively and then interconnected, and the side wall adjacent to the side 70 where sound absorption surface layer is located and the side 50 where sound insulation surface layer is located is set as concave-convex joint structure on the joint face in the thickness direction of the board for the convenience of positioning upon connection. The setting of a concave-convex joint structure on the joint face in the thickness direction is useful to increase binding area, and improve binding strength. Sides are generally spliced to facilitate the tightness of resonance sound absorption cavity, and guarantee sound absorption property.

Figure 18:
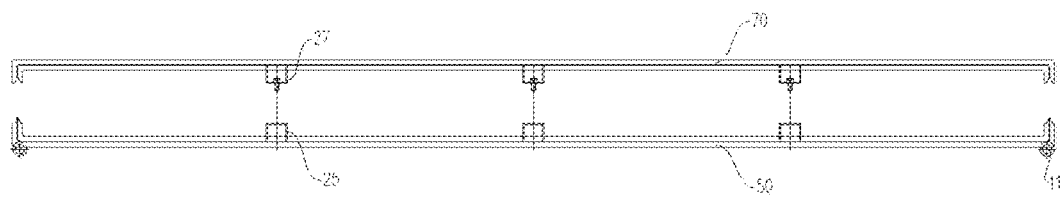
FIG. 18 is the schematic diagram of another half-subdivision composite structure available for particulate sound absorption/insulation board of this invention.
Figure 19:
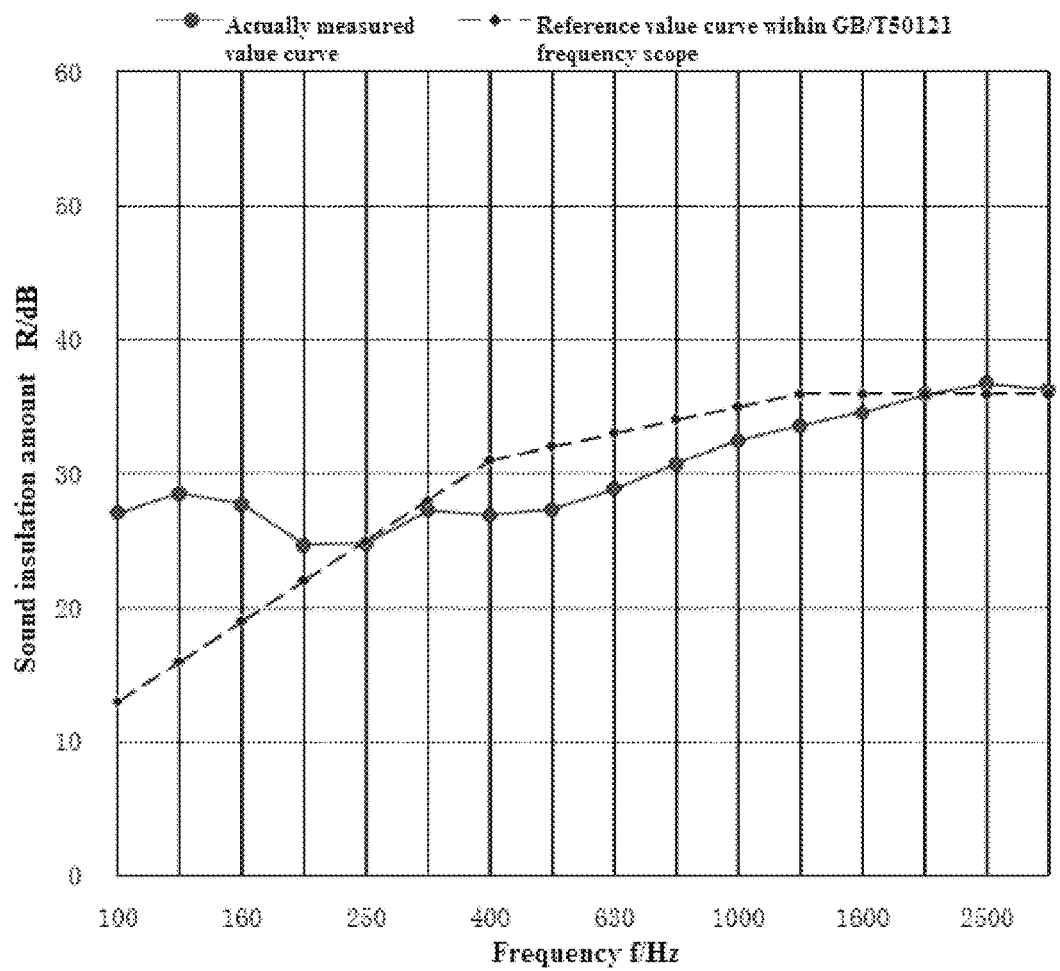
FIG. 19 is the sound insulation test results of the embodiments.
Figure 20:
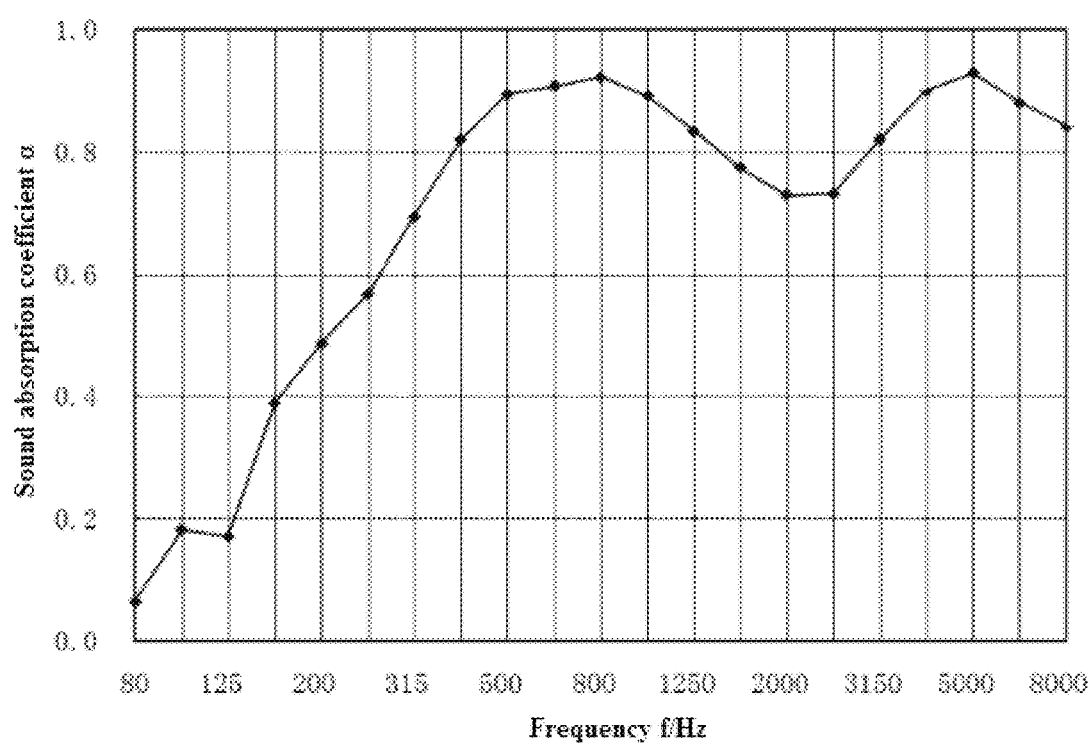
FIG. 20 is the sound absorption test results of the embodiments.

As shown in FIGS. 17 and 18, the inner side of the said sound absorption surface layer 7 is provided with the rib 27, and the inner side of the sound insulation surface layer 5 is provided with the rib 25. Ribs 27 and 25 are mutually corresponding and connected to form the rib wall 2, which is useful to improve connection strength and board surface strength. Ribs 25 and 27 can be formed together with particle board, and generally spliced or bolted if the metal section connected to the reinforcing rib layer in the particle board is used.

As shown in FIG. 1-20, the particulate sound barrier of this invention consists of column 14 and more than two overlapped sound absorption/insulation boards 1 fixed between adjacent columns 14. The said sound absorption/insulation board 1 is composed of sound absorption surface layer 7 on one side and sound insulation surface layer 5 on the opposite side. The said sound absorption surface layer 7 is made of particulate sound absorption board 8 which is composed of particle and binding agent layer on the external surface of the said particle. The said particle is composed of skeleton particle 81 and filling particle 82, in which the former is used for sound absorption board skeleton, and the latter flows into the pore between skeleton particles to form sound absorption pore 83; the sound insulation surface layer 5 is made of particulate sound insulation board 6 which is composed of skeleton and filler. The said skeleton is formed by splicing skeleton particles 61, and the said filler consists of filling particle 62, binding agent and coupling agent 63. The skeleton pore is filled with fillers, and the cavity in the board body forms a resonance sound absorption cavity 9 that functions together with sound absorption surface layer 7.

The sound absorption/insulation board 1 is free from sound absorption filling materials. The main improvement of the said sound barrier is the selection of sound absorption/insulation board for sound barrier of this invention, which means the board body is made of particulate sound absorption board and particulate sound insulation board to ensure the sound barrier has a better weather resistance.

Figure 5:
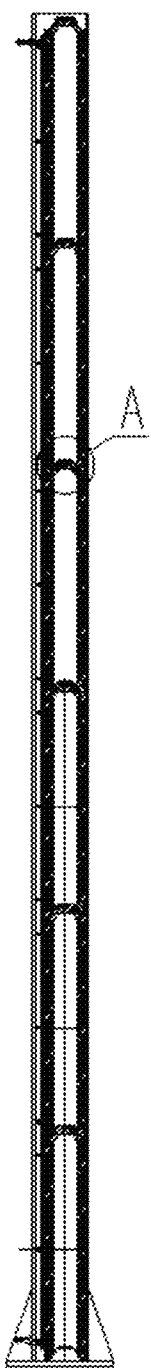
FIG. 5 is the right view of FIG. 4.
Figure 6:
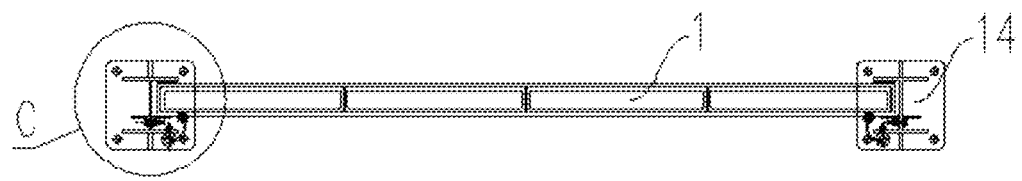
FIG. 6 is the top view of FIG. 4.
Figure 7:
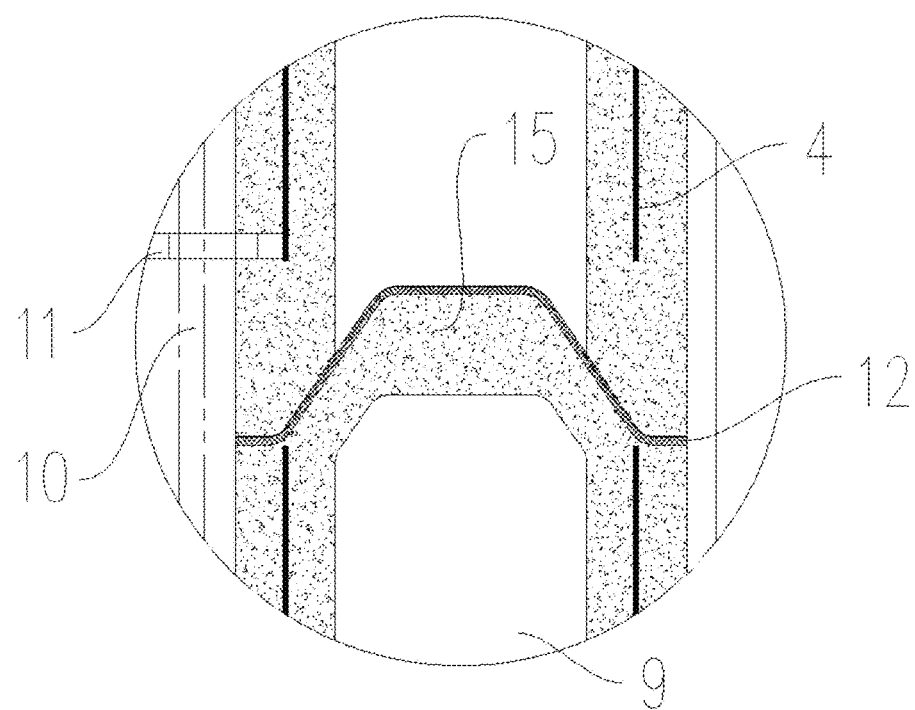
FIG. 7 is the partial enlarged view of Part A of FIG. 5.
Figure 8:
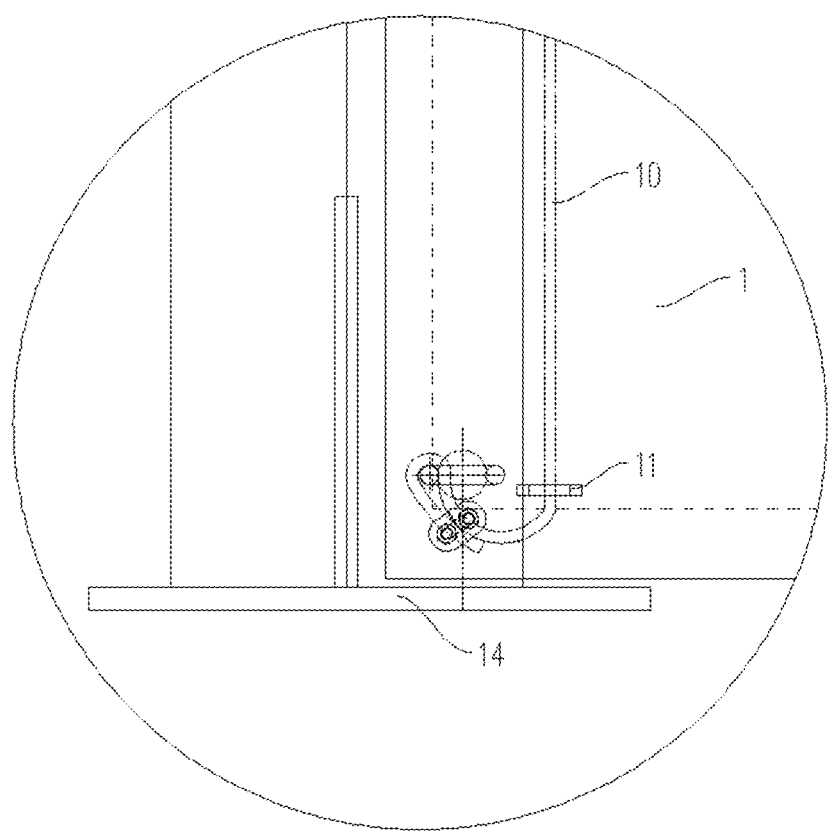
FIG. 8 is the partial enlarged view of Part B of FIG. 4.
Figure 9:
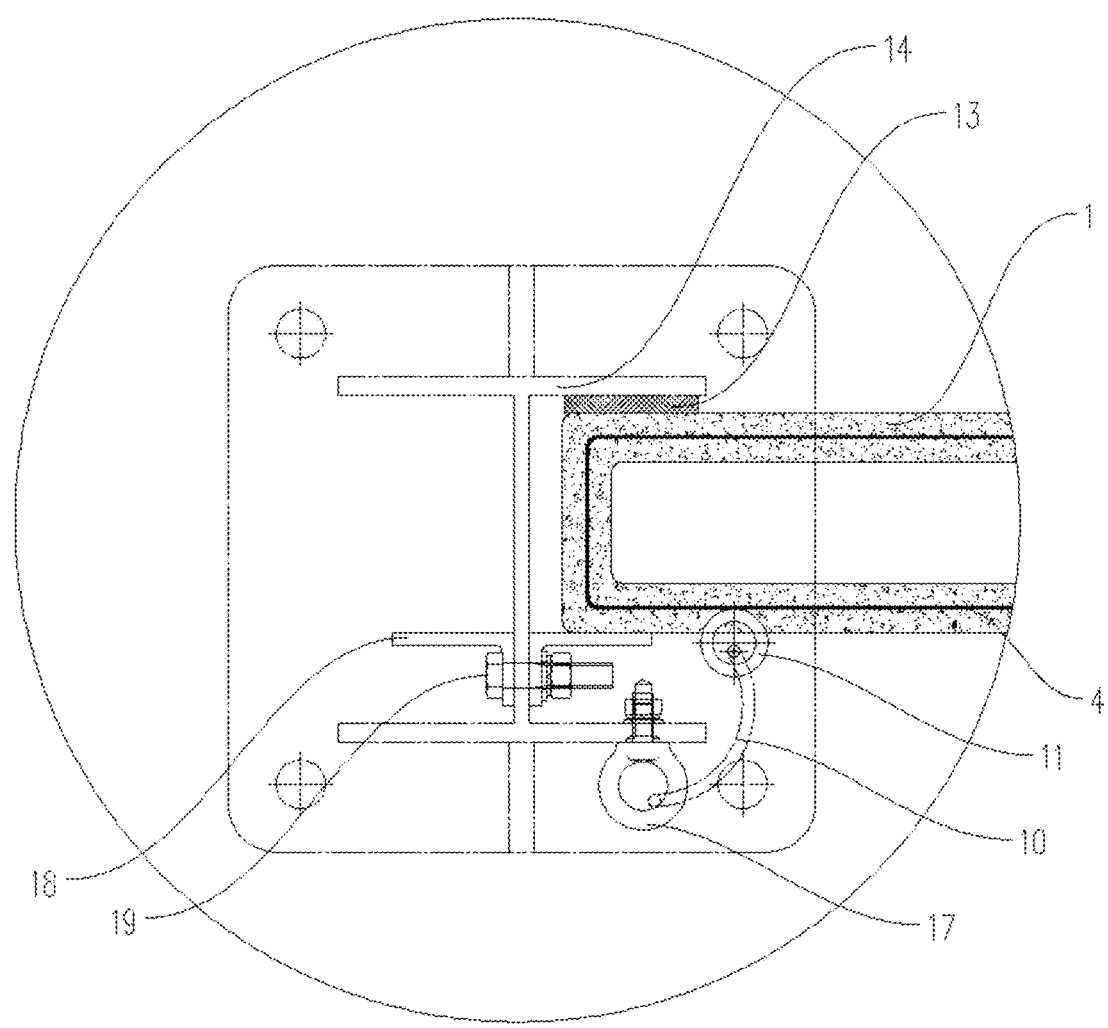
FIG. 9 is the partial enlarged view of Part C of FIG. 6.
Figure 10:
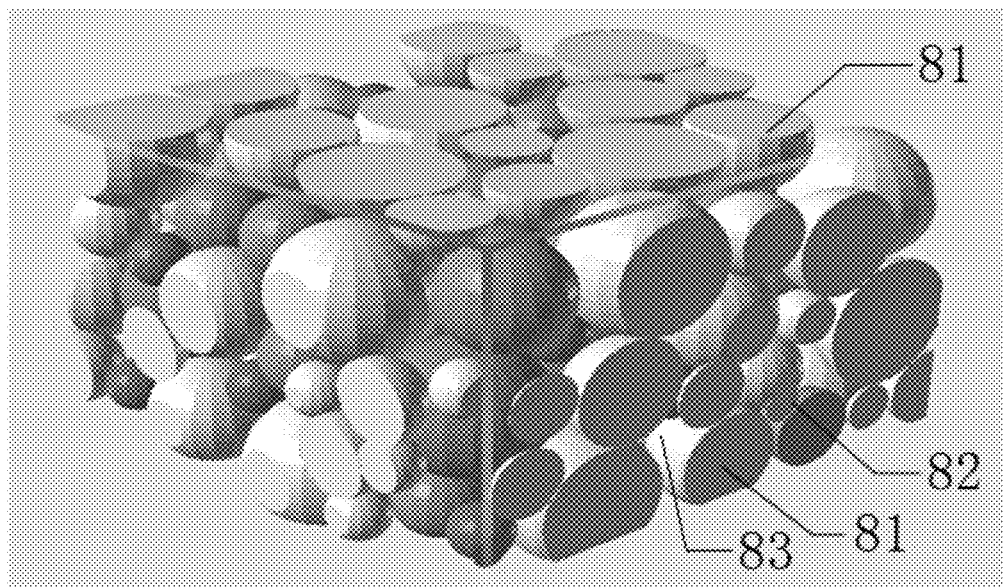
FIG. 10 is the structure diagram of particulate sound absorption board.
Figure 11:
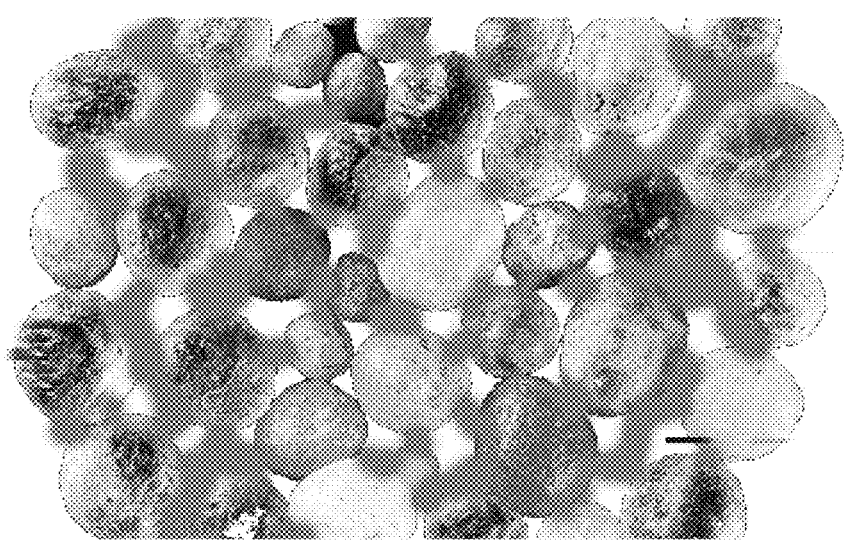
FIG. 11 is the microstructure picture of particulate sound absorption board.
Figure 12:
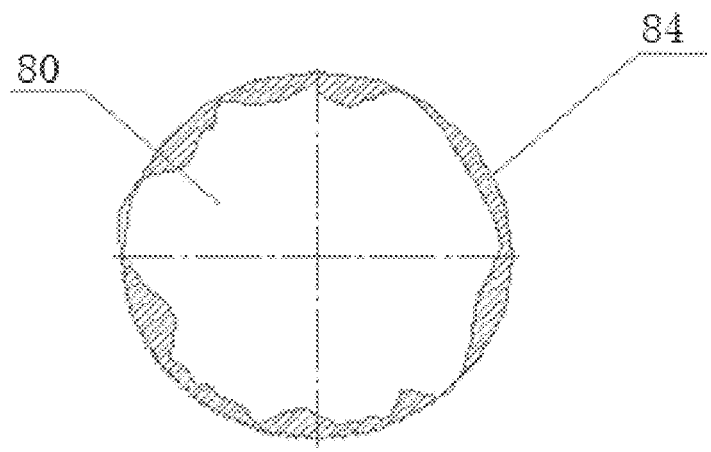
FIG. 12 is the structure diagram of particles used for particulate sound absorption board.
Figure 13:
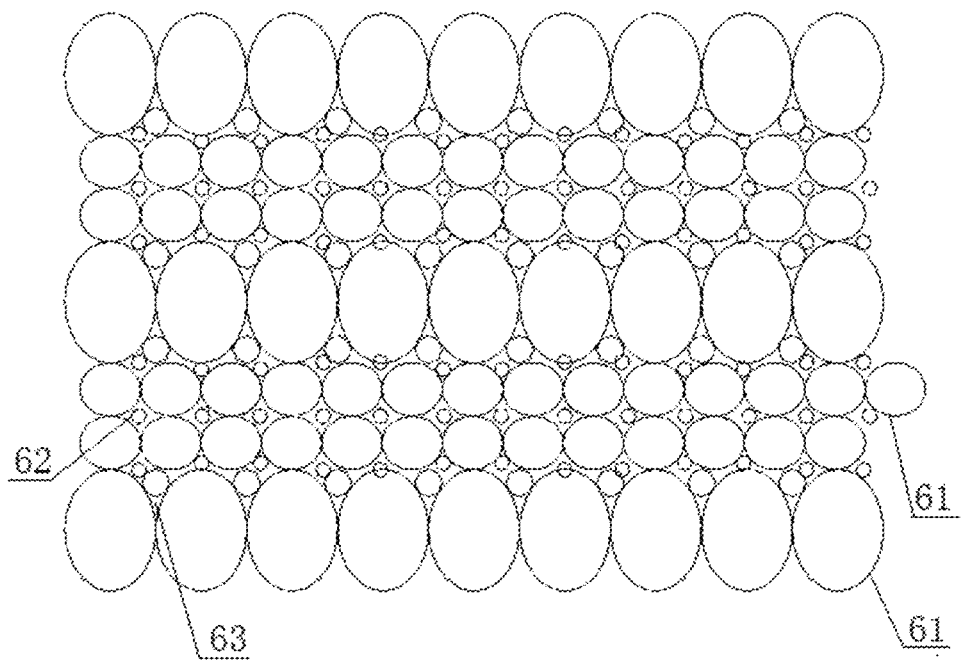
FIG. 13 is the structure diagram of particulate sound insulation board.
Figure 14:
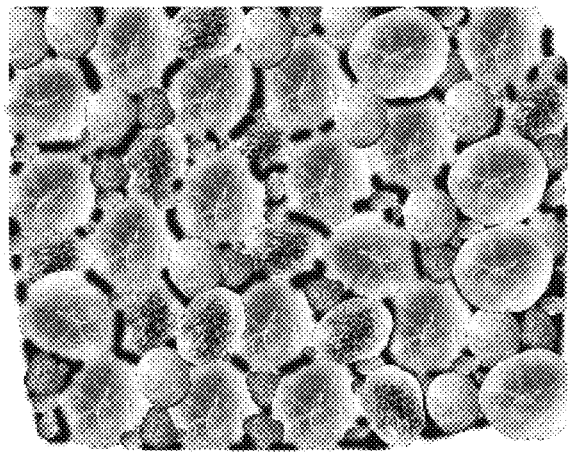
FIG. 14 is the microstructure picture of particulate sound insulation board.

As shown in FIGS. 5 and 7, a concave-convex joint end face is set on the said sound absorption/insulation board 1 along the extension direction of board surface. The convex 15 of the said concave-convex joint end face is a convex solid board surface, and connected to sound absorption surface layer 7 and sound insulation surface layer 5. The concave 16 of the said concave-convex joint end face is a hollow opening surface. In the adjacent two sound absorption/insulation boards 1, the convex 15 of the lower sound absorption/insulation board 1 is matched with the concave 16 of the upper sound absorption/insulation board 1. At the joint part of adjacent sound absorption/insulation boards, the sealing cushion 12 is bound on the said convex 15, and generally made of rubber, which can guarantee the tightness of resonance sound absorption cavity in the board body and good sound absorption property, and ensure the joint between sound absorption/insulation boards 1 has good sound insulation effect.

As shown in FIGS. 4, 6, 8 and 9, inner sides of the said sound insulation surface layer 5 and sound absorption surface layer 7 are provided with reinforcing rib layer 4 which is made of fiberglass mesh or wire mesh, and both sides of the said sound insulation surface layer 5 adjacent to column 14 are fixed with metal ring 11, and the said metal ring 11 is connected to the reinforcing rib layer 4. Reinforcing rib layer 4 and metal ring 11 are inserted during the formation of the board to improve the overall structure strength and connection strength, and tightened with steel wire rope 10 when the board is assembled as the sound barrier, and the lower and upper sound absorption/insulation boards 1 are tightly compacted. The sealing cushion 12 is closely connected to the sound absorption/insulation board 1, so no pore is formed to prevent sound leakage. Each sound absorption/insulation board 1 is firmly fixed on the fixed pull ring 17 on the column 14.

EMBODIMENTS

As shown in FIG. 1-14, the particulate sound barrier used for high-speed railway consists of a series of column 14 and several overlapped sound absorption/insulation boards 1 fixed between adjacent columns 14. The said sound absorption/insulation board 1 is pressed on the column 14 with press plate 18 and bolt 19, and connected to the nearest column 14 with metal ring 11 and steel wire rope 10. The sound absorption/insulation board 1 is composed of sound absorption surface layer 7 on one side and sound insulation surface layer 5 on the opposite side. The said sound absorption surface layer 7 is made of particulate sound absorption board 8, and the sound insulation surface layer 5 is made of particulate sound insulation board 6. Inner sides of the sound insulation surface layer 5 and sound absorption surface layer 7 are provided with reinforcing rib layer 4. The reinforcing rib is 25×25 mm wire mesh made of steel wire with the diameter of 3 mm. The metal ring 11 is connected to the reinforcing rib layer 4, and the cavity in the board body forms a resonance sound absorption cavity 9 that functions together with sound absorption surface layer 7. The sound absorption/insulation board 1 is free from sound absorption filling materials, and a concave-convex joint end face is set on the said sound absorption/insulation board 1 along the extension direction of board surface. The convex 15 of the said concave-convex joint end face is a convex solid board surface, and connected to sound absorption surface layer 7 and sound insulation surface layer 5. The concave 16 of the said concave-convex joint end face is a hollow opening surface, and the sealing cushion 12 is bound on the said convex 15, and made of EPDM rubber.

The particulate sound barrier is designed based on the noise frequency spectrum of high-speed railway, and the sound absorption pore of the sound barrier is controlled based on the grading of particles so as to absorb middle and high-frequency noise of high-speed railway in a better manner. Particles used for particulate sound absorption board 8 consist of the following components: 90 skeleton particles with average diameter of 0.8 mm, 10 filling particles with average diameter of 0.15 mm. The addition amount of the said binding agent is 3.5-6% by total weight of skeleton particle and filling particle, and 1-5% of coupling agent by weight of binding agent is added into the said binding agent. The particulate sound insulation board 6 consists of the following components by weight: skeleton: 40-45 skeleton particles with average diameter of 0.8 mm and 0.4 mm, respectively; filler: filling particle consists of the following components by weight, 3.5-7 filling particles with average diameter of 0.2 mm, 7-14 filling particles with average diameter of 0.1 mm; binding agent and coupling agent: the addition amount of binding agent is 4-6% by total weight of skeleton particle and filling particle, and the addition amount of coupling agent is 1-5% by addition amount of binding agent. Coupling agent refers to silane coupling agent and coupling agent containing isobutyl functional group. After the addition of coupling agent, the hydrophobic layer can be formed on the sound absorption board and sound insulation board to prevent the moisture into the particle board so as to ensure the sound absorption/insulation board has waterproof and anti-corrosion property.

10 m² sound barrier is designed and manufactured based on the thicknesses of sound absorption surface layer, resonance sound absorption cavity and sound insulation surface layer (20 mm, 50 mm and 20 mm respectively), and the test is carried out in the live room. Noise reduction coefficient NRC is up to 0.75, and sound insulation amount Rw=32 dB. See Table 1 for actual sound insulation data, and see Table 2 for actual sound absorption data.

TABLE 1

Actual Sound Insulation Data

| Frequency/Hz | 100 | 125 | 160 | 200 | 250 | 315 | 400 | 500 |
|---|---|---|---|---|---|---|---|---|
| Actual sound insulation amount/dB | 27.0 | 28.5 | 27.7 | 24.7 | 24.8 | 27.3 | 26.9 | 27.3 |
| Frequency/Hz | 630 | 800 | 1000 | 1250 | 1600 | 2000 | 2500 | 3150 |
| Actual sound insulation amount/dB | 28.9 | 30.8 | 32.5 | 33.5 | 34.6 | 35.9 | 36.8 | 36.3 |

TABLE 2

Actual Sound Absorption Data

| Frequency/Hz | 100 | 125 | 160 | 200 | 250 | 315 | 400 | 500 | 630 |
|---|---|---|---|---|---|---|---|---|---|
| Sound absorption coefficient/α | 0.18 | 0.17 | 0.39 | 0.49 | 0.57 | 0.69 | 0.82 | 0.89 | 0.91 |
| Frequency/Hz | 800 | 1000 | 1250 | 1600 | 2000 | 2500 | 3150 | 4000 | 5000 |
| Sound absorption coefficient/α | 0.92 | 0.89 | 0.83 | 0.77 | 0.73 | 0.73 | 0.82 | 0.90 | 0.93 |

The sound absorption and insulation properties of the said particulate sound barrier can fully meet related high-speed railway standards in China. The said sound barrier also has good weather resistance. The sound absorption/insulation board for particulate sound barrier can use the particles of different colors to meet appearance requirements proposed by customers without painting. In addition, the said particulate sound barrier is not easily polluted, and can be directly rinsed with water when there is dirt on the surface. The particulate sound barrier has good anti-corrosion and waterproof property, and its acoustic performance can remain stable for a long time.

The invention claimed is:

1. A particulate sound absorption/insulation board, comprising:
   a sound absorption surface layer, a sound insulation surface layer, and the sound absorption surface layer and the sound insulation surface layer are arranged substantially parallel to each other, defining a resonance sound absorption cavity in between,
   wherein the sound absorption surface layer is made from a particulate sound absorption board and the sound insulation surface layer is made from a particulate sound insulation board,
   wherein the particulate sound absorption board and the particulate sound insulation board each comprises skeleton particles, filling particles, and an organic binding agent, and
   wherein the particulate sound absorption board and the particulate sound insulation board have different compositions,
   wherein the organic binding agent is epoxy resin, phenolic resin, urea resin, or furfuryl alcohol resin,
   and wherein the organic binding agent is 3.5-6% by weight based on a total weight of the skeleton particles and the filling particles.

2. The particulate sound absorption/insulation board according to claim 1, wherein the resonance sound absorption cavity in the board does not contain sound absorption filling materials.

3. The particulate sound absorption/insulation board according to claim 1, wherein a thickness ratio of the sound absorption surface layer and the resonance sound absorption cavity is 1:3-5.

4. The particulate sound absorption/insulation board according to claim 1, wherein a thickness of the sound absorption surface layer is 10-30 mm, and a thickness of the resonance sound absorption cavity is 30-150 mm.

5. The particulate sound absorption/insulation board according to claim 1, wherein a thickness of sound insulation surface layer is 20-40 mm.

6. The particulate sound absorption/insulation board according to claim 5, wherein the particulate sound insulation board comprises 40-45 weight percent skeleton particles having an average diameter of 0.8 mm and 0.4 mm, 3.5-7 weight percent filling particles having an average diameter of 0.2 mm, and 7-14 weight percent filling particles having an average diameter of 0.1 mm.

7. The particulate sound absorption/insulation board according to claim 1, wherein a weight ratio between the skeleton particles and the filling particles in the particulate sound absorption board is 90:10, wherein the skeleton particles have an average diameter of 0.8 mm and the filling particles have an average diameter of 0.15 mm.

8. The particulate sound absorption/insulation board according to claim 1, wherein the sound absorption particulate board further comprises a coupling agent of 1-5% by weight based on the total weight of the skeleton particles and the filling particles.

9. The particulate sound absorption/insulation board according to claim 1, further comprising a first concave-convex joint end and a second concave-convex joint end, each connecting the sound absorption surface layer and the sound insulating surface layer, wherein the first concave-convex joint end has its convex surface protruding away from the resonance sound absorption cavity and the second concave-convex joint end has its convex surface protruding into the resonance sound absorption cavity.

10. The particulate sound absorption/insulation board according to claim 1, wherein a sealing cushion is affixed to the convex surface of the first convex-concave joint end.

11. The particulate sound absorption/insulation board according to claim 1, further comprising reinforcing ribs installed inside the sound absorption surface layer and the sound insulation surface layer, respectively.

12. The particulate sound absorption/insulation board according to claim 11, further comprising one or more reinforcing ribs connecting the sound absorption surface layer and the sound insulation surface layer.

13. The particulate sound absorption/insulation board according to claim 1, wherein the sound insulation surface layer has a thickness of 20-50 mm and the sound absorption surface layer has a thickness of 40-100 mm.

14. A particulate sound barrier, comprising: a pair of columns and at least a first and a second sound absorption/insulation boards of claim 9 installed between the pair of columns.

15. The particulate sound barrier according to claim 14, wherein the two or more sound absorption/insulation boards are installed in a manner that a convex surface of a first convex-concave joint end of the first sound absorption/insulation board is inserted into a concave surface of a second convex-concave joint end of the second sound absorption/insulation board.

16. The particulate sound barrier according to claim 14, wherein the first convex surface the first convex-concave joint end of the first sound absorption/insulation board has a sealing cushion layer made of rubber.

17. The particulate sound barrier according to claim 1, wherein the skeleton particles and the filling particles are selected from sand, ceramsite, and recycle building waste particles.

* * * * *